(No Model.)
G. G. DAVIS & E. SAWYER.
CHURN.
No. 513,361. Patented Jan. 23, 1894.
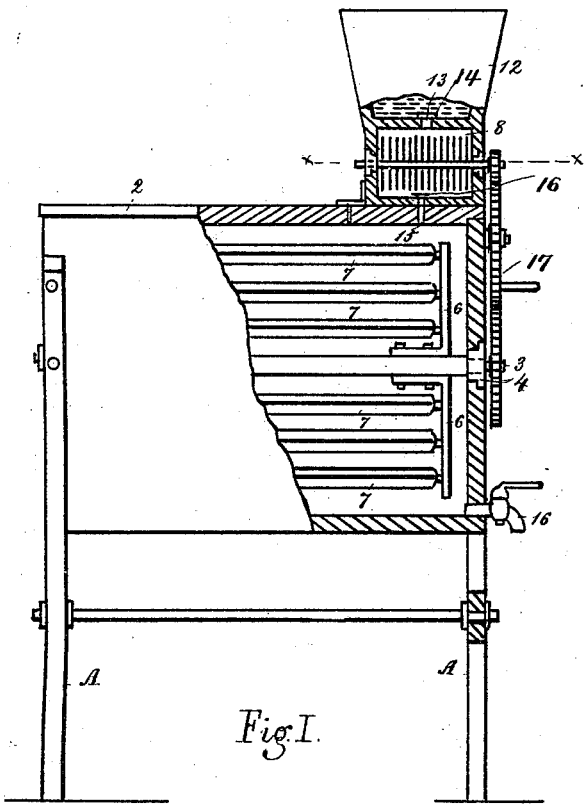
Fig. I.
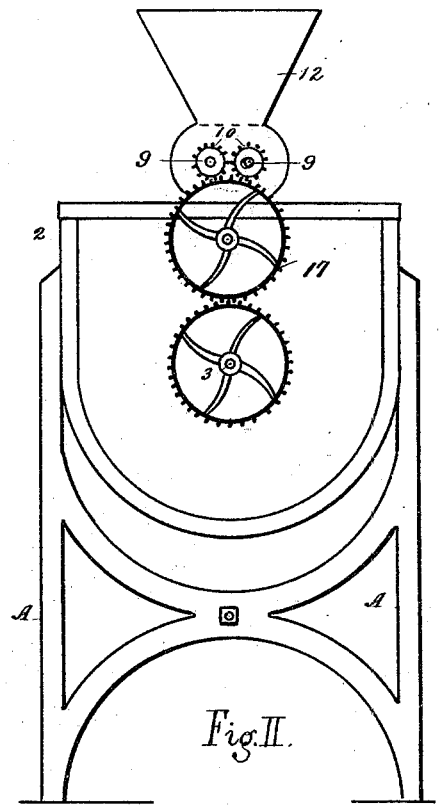
Fig. II.
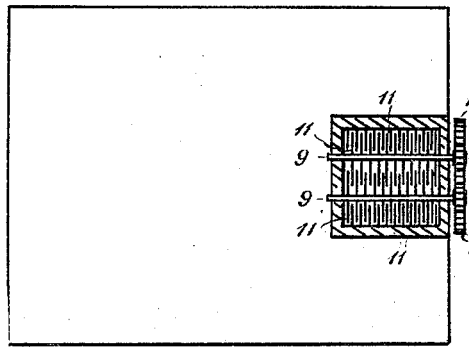
Fig. III.
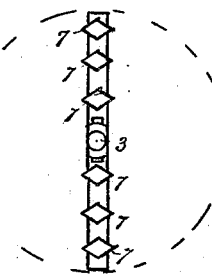
Fig. IV.
Witnesses.
R. S. Millar
L. M. Adams
Inventors
G. G. Davis & E. Sawyer
By J. Bailey Atty

UNITED STATES PATENT OFFICE.

GEORGE G. DAVIS AND ENOCH SAWYER, OF BLACK PINE, MONTANA.

CHURN.

SPECIFICATION forming part of Letters Patent No. 513,361, dated January 23, 1894.

Application filed May 22, 1893. Serial No. 475,140. (No model.)

*To all whom it may concern:*

Be it known that we, GEORGE G. DAVIS and ENOCH SAWYER, citizens of the United States, residing at Black Pine, in the county of Granite and State of Montana, have invented a new and useful Improvement in Churns, which improvement is fully set forth in the following specification and accompanying drawings, in which—

Figure I is a side elevation, partly in section, of our improved churn; Fig. II, an end elevation of the same; Fig. III, a detail view of the breaking apparatus on line x x of Fig. 1, and Fig. IV, a detail view showing the gathering bars in cross section.

Our invention relates to improvements in churning apparatus and its object is to provide a simple, novel and effective device whereby the cream is first subjected to a process by which the cells or sacks which contain the butter are effectually ruptured or broken, and the granules afterward exposed to the action of a series of bars so formed as to collect the same and separate them from the whey and other resultant products.

The peculiar construction and operation of the invention are described in the following specification and accompanying drawings, in which—

A designates the end frames and 2 the body of the churn.

A main shaft 3 extends longitudinally through the center of the churn and revolves in suitable bearings 4. In order to provide for the removal of the shaft and its adjuncts when desired, it is made separable by a tongue and groove splice 5 which is secured by set screws and bolts in a clamp formed by the horizontal extensions of angle irons 6. The opposite end of the shaft is mounted in the same manner.

The vertical extensions of the angle irons carry a series of bars or gatherers 7 which are diamond shaped in cross-section as shown in Fig. 4. A chamber or receptacle 8 elliptical in cross-section is removably attached to the top of the churn and contains two parallel shafts 9 actuated by pinion wheels 10. Each of these shafts carries a transversely arranged series of fingers or breakers 11, which, like the gatherers, are diamond shaped in cross section and are relatively so spaced and adjusted that when in motion they intermesh closely the one with the other, without coming into actual contact. The cream is placed in the hopper 12 and passes therefrom into the breaking chamber through an orifice 13. The inflow is regulated at will, or shut off when desired, by a sliding valve 14. After being subjected to the breakers, the mass gradually passes into the body of the churn through an orifice 15 which is approximately one fourth the diameter of the orifice 13, and is similarly provided with a regulating valve. It will be observed that the cream is thus retarded in its passage until the entire mass has been thoroughly exposed to the action of the rapidly revolving breakers, after which it is discharged into the churn where the particles of the butter, being released from their cells, are quickly collected by the gatherers and separated from the whey and other ingredients which may be drawn off through the faucet 16. A driving wheel 17 having its shafts journaled in a suitable bearing on the end of the churn, imparts motion by cogged wheels on the ends of their respective shafts 9 and 3 simultaneously to the breaker shafts and the gatherers.

We are aware that it is not broadly new to place over the main churn a small chamber in which the cream is agitated before its admission into the churn body proper.

What we claim as new is—

The combination with a churn, having within it the main shaft and gathering bars, of the described chamber or receptacle removably attached to the top of the churn, and having in its upper part a hopper in which the cream is placed, said hopper having in its bottom a valved orifice, the rotatable intermeshing fingers or breakers in said chamber below the cream hopper, and below same a valved orifice, the said main shaft and the shaft of the rotatable intermeshing breakers operated by driving wheel and connections, all substantially as shown and described.

In testimony that we claim the foregoing we have hereunto set our hands, this 17th day of April, 1893, in the presence of witnesses.

GEORGE G. DAVIS.
ENOCH SAWYER.

Witnesses:
GEORGE WILSON,
H. W. RODGERS.